United States Patent [19]

Bächler et al.

[11] Patent Number: 4,642,995
[45] Date of Patent: Feb. 17, 1987

[54] DAMPED DISPLACER REFRIGERATING MACHINE

[75] Inventors: Werner Bächler, Rösrath; Rolf Heisig, Weilerswist; Hans-Hermann Klein, Rösrath; Karl-Heinz Völker, Titz, all of Fed. Rep. of Germany

[73] Assignee: Leybold-Hearaeus GmbH, Cologne, Fed. Rep. of Germany

[21] Appl. No.: 719,363

[22] Filed: Apr. 3, 1985

[30] Foreign Application Priority Data

Apr. 11, 1984 [DE] Fed. Rep. of Germany ... 8411307[U]

[51] Int. Cl.⁴ ............................................. F25B 9/00
[52] U.S. Cl. ................................. 62/6; 60/520;
                                   92/85 R; 92/85 A; 267/158
[58] Field of Search ............. 62/6, 296; 92/85 R,
                              92/85 A; 267/158, 161, 163; 60/520

[56] References Cited

U.S. PATENT DOCUMENTS

| 2,396,052 | 3/1946 | Light | 92/85 A |
| 2,678,072 | 5/1954 | Verderber | 92/85 R |
| 3,114,388 | 12/1963 | Hoen | 267/161 |
| 3,465,997 | 9/1969 | Piske | 267/160 |
| 3,668,975 | 6/1972 | Nelson | 92/85 A |
| 3,802,211 | 4/1974 | Bamberg et al. | 62/6 |
| 4,364,615 | 12/1982 | Euler | 267/161 |
| 4,365,982 | 12/1982 | Durenec | 62/6 |
| 4,542,852 | 9/1985 | Orth et al. | 267/161 |

FOREIGN PATENT DOCUMENTS 118248 2/1947 Denmark ........................... 267/163

Primary Examiner—Ronald C. Capossela
Attorney, Agent, or Firm—Felfe & Lynch

[57] ABSTRACT

A refrigerating machine having a displacer reciprocable in a hollow space having a substantially-closed end for the refrigerating operation has a spring between the displacer and the substantially-closed end of the hollow space for damping vibration and noise of the displacer reciprocation.

7 Claims, 14 Drawing Figures

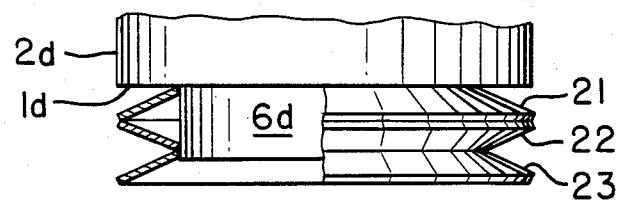
FIG. 11
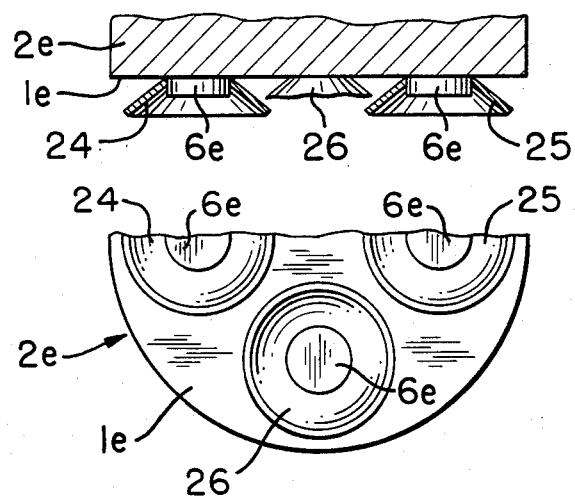
FIG. 12
FIG. 13
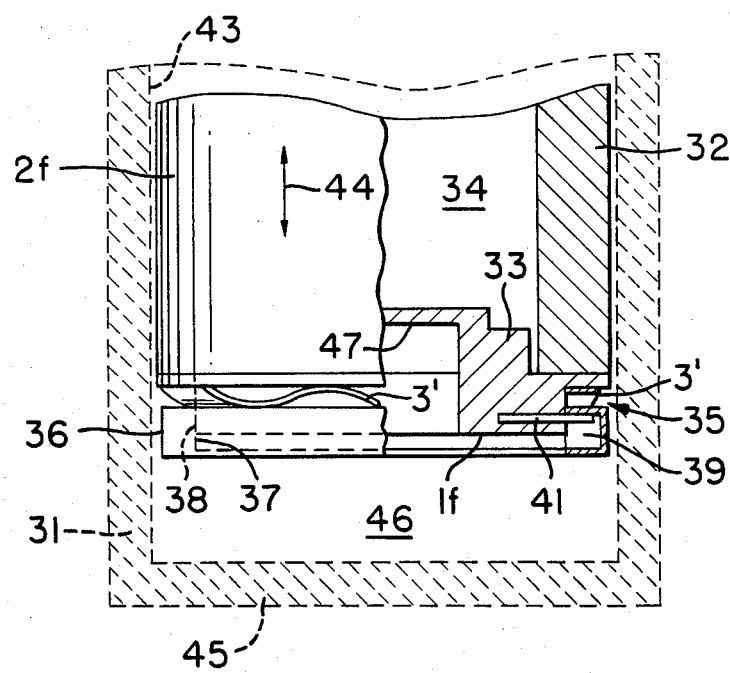
FIG. 14

DAMPED DISPLACER REFRIGERATING MACHINE

BACKGROUND OF THE INVENTION

The invention relates to a displacer damper for a refrigerating machine having at least one cylinder/displacer arrangement.

Refrigerating machines having a hollow, generally-cylindrical space substantially closed at least at one, working end and a displacer across the hollow space and reciprocable therealong to define a variable working space between the displacer and the substantially-closed, working end of the hollow space are known and particularly useful for producing especially-low temperatures. See, for example, U.S. Pat. No. 2,906,101.

The working space is filled with a working gas and connected into a closed, working-gas loop in such a manner relative to forced reciprocation of the displacer that the working gas experiences a thermodynamic cycle (Stirling cycle, Gifford-McMahon cycle, etc.). As a result, heat is removed from one end of the working space. With a two-stage refrigerating machine of this type using helium as the working gas, temperatures of 10° K. or even lower can be produced.

The displacer can be forced to reciprocate mechanically, by a connecting rod and crank shaft; pneumatically, by enclosing the other end of the hollow space, on the opposite side of the displacer from the working end, and applying high and low driving gas pressures alternately thereto; or by other arrangements. No matter how the displacer is reciprocated, however, the reciprocation of the displacer produces a universal drawback of this type of refrigerating machine; the reciprocation of the displacer must be damped or the rhythmic vibrations resulting therefrom tolerated in the refrigerating machine and, unless extremely-costly dampers are used between the refrigerating machine and connected equipment, in the connected equipment.

Damping the reciprocation of the displacer is a particular problem with pneumatically reciprocated displacers in refrigerating machines operating on a Gifford-McMahon cycle, because the minimum working space in this cycle should be extremely small. As a result, the displacer may hit the substantially-closed, working end of the hollow space to aggrevate the vibration problem from the displacer reciprocation and generate noise which, in the long run, is disturbing.

In one attempt to solve the displacer vibration problem, German patent application DAS No. 25 16 591 discloses a refrigerating machine in which the displacer is suspended from springs on both sides. The springs and displacer form a mass/spring system which, of course, complicates achieving displacer reciprocation appropriate for the desired thermodynamic cycle. Moreover, the spiral or helical springs used require a dead space (that is, the smallest cylinder space achievable at the two end positions of the displacer) which is very large. This is a particularly-serious drawback for the working space of a refrigerating machine operating on a Gifford-Mahon cycle and may make this cycle unattainable.

In another attempt, German patent application DOS No. 33 13 506 discloses a refrigerating machine in which trapped gas is said to act as a shock absorber for the displacer. However, this requires a complicated structural design. Besides, it is still inherently afflicted with the dead-space problem.

SUMMARY OF THE INVENTION

An object of the invention is, therefore, providing a refrigerating machine of the type outlined at the outset having a damper for damping displacer reciprocation at least toward the working end of the hollow, working space which is of simple design and avoids the dead-space problem.

The invention achieves this and other objects with a spring in a refrigerating machine having a displacer across hollow space and reciprocable toward and away from a substantially-closed end of the hollow space. The spring is in the hollow space between its substantially-closed end and the displacer and has spring (expansion and compression) action in the direction of displacer reciprocation to a maximum (unexpanded) dimension which is less than, and preferably much less than, the maximum distance from the substantially-closed end of the hollow space to which the displacer reciprocates and greater than, but preferably only slightly greater than, the minimum distance from the substantially-closed end of the hollow space to which the displacer reciprocates. In this way, the spring is disengaged from at least one of the substantially-closed end and displacer during at least a portion of the displacer reciprocation, and preferably almost all of it, to avoid interference with the thermodynamic cycle of refrigerating operation produced thereby, but is compressed as the displacer approaches the substantially-closed end of the hollow space to damp the vibration and noise which otherwise could be produced by contact between the substantially-closed end of the hollow space and the displacer.

From the above description of the preferred form of the spring, it can be seen that the preferred spring can be characterized as flat and that it correspondingly requires a minimum of dead space between the substantially-closed end of the hollow space and the displacer. When the variable space between the substantially-closed end of the hollow space and the reciprocating displacer therein is the working space of the refrigerating machine, this has particular advantage for operating the refrigerating machine on a Gifford-McMahon thermodynamic cycle.

The preferred, flat spring is, furthermore, connected at one end to the displacer for reciprocation therewith. Advantageously, then, an adaptor is disposed on the other side of the flat spring for displacement opposite to the direction of displacer reciprocation to minimize the dead space further.

BRIEF DESCRIPTION OF THE DRAWINGS

Further advantages and details which illustrate but do not limit the invention will now be described with reference to merely-preferred embodiments shown in the figures, wherein:

FIG. 11 is an elevation, partly broken away and partly in section, of a tenth preferred embodiment;

FIG. 12 is an elevation, partly in section, of an eleventh preferred embodiment;

FIG. 13 is a partial, bottom view of the embodiment shown in FIG. 12; and

FIG. 14 is an elevation, partly broken away and partly in section, of a twelfth preferred embodiment;

DESCRIPTION OF THE PREFERRED EMBODIMENTS

Figure 1:
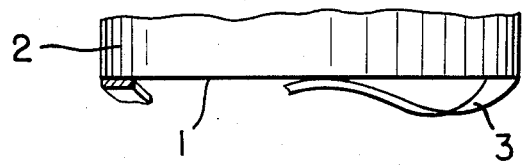
FIG. 1 is an elevation, partly broken away and partly in section, of a first preferred embodiment.
Figure 2:
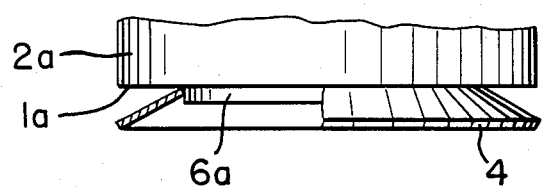
FIG. 2 is an elevation, partly broken away and partly in section, of a second preferred embodiment.
Figure 3:
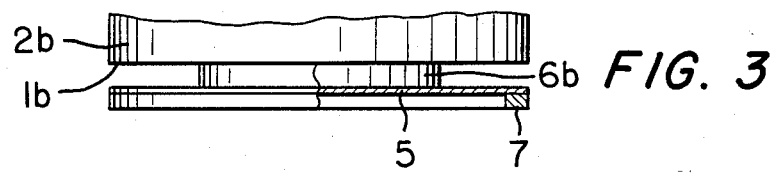
FIG. 3 is an elevation, partly broken away and partly in section, of a third preferred embodiment.

FIGS. 1 to 3 show, respectively, a corrugated-ring spring 3, a disk-ring spring 4, and a plate spring 5 in association with end faces 1, 1a, 1b of a displacer 2, 2a, 2b of a refrigerating machine (not shown). Each spring is sheet metal. The disk and plate springs 4, 5 are attached to reduced-diameter, projecting sections 6a, 6b of the end of faces of the displacers 2a, 2b, for example by force fit (FIG. 2) or welding (FIG. 3). The plate spring 5 carries a narrow, peripheral ring 7 on the side opposite the displacer 2b so that there is spring action between the ring 7 and the outer circumference of the reduced-diameter, projecting section 6b of the end face 1b of the displacer.

Figure 4:
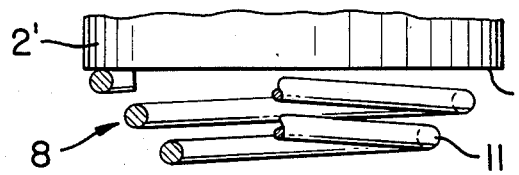
FIG. 4 is an elevation, partly broken away and partly in section, of a fourth preferred embodiment.
Figure 5:
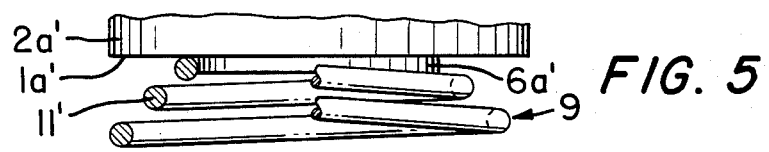
FIG. 5 is an elevation, partly broken away and partly in section, of a fifth preferred embodiment.

FIGS. 4 and 5 show, respectively, conical, coil springs at 8, 9 associated with end faces 1', 1a' of displacers 2', 2a'. The spring at 9 in FIG. 5 is attached to the displacer 2a' by wrapping about a reduced-diameter, projecting section 6a' of the end face of the displacer. To avoid too large a dead space, the springs at 8, 9 should be conically designed so that their thickness in the compressed state corresponds to the thickness of the spring wires 11, 11' used.

Figure 6:
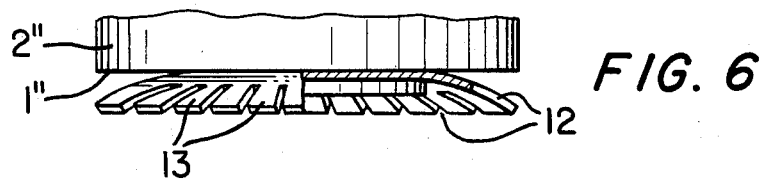
FIG. 6 is an elevation, partly broken away and partly in section, of a sixth preferred embodiment.
Figure 7:
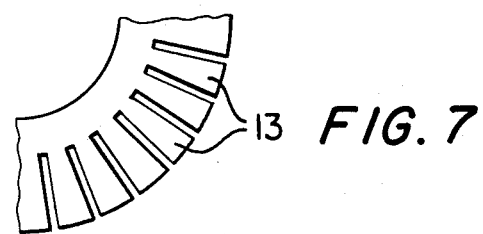
FIG. 7 is a partial, bottom view of the preferred embodiment shown in FIG. 6.

FIGS. 6 and 7 show a sheet metal radial spring 12 on an end face 1" of a displacer 2". The radial spring 12 is like a disk spring, but having radial slots so that radially-directed, spring-action tongues 13 are present.

Figure 8:
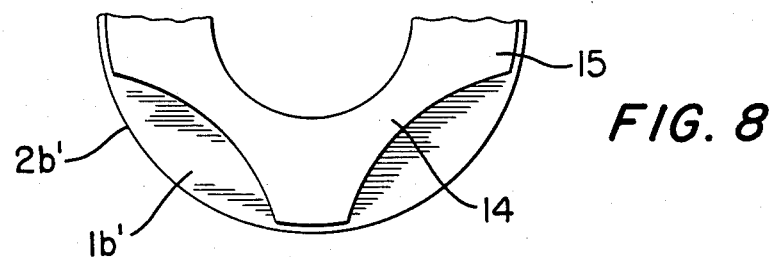
FIG. 8 is a partial, bottom view of a seventh preferred embodiment.
Figure 9:
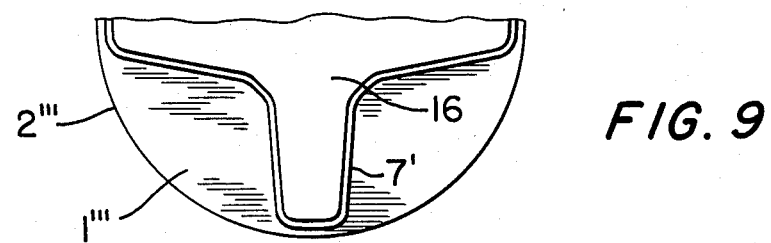
FIG. 9 is a partial, bottom view of a eighth preferred embodiment.
Figure 10:
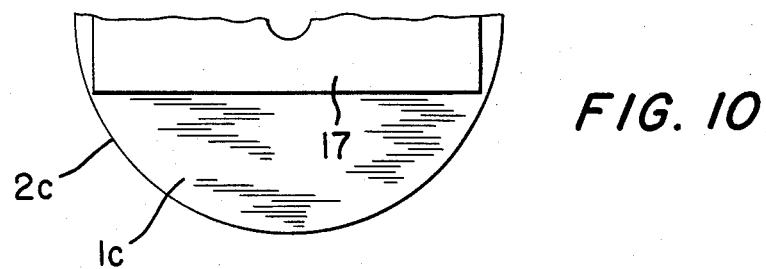
FIG. 10 is a partial, bottom view of a ninth preferred embodiment.

FIGS. 8 to 10 show, respectively, half views of end faces 1b', 1''', 1c of displacers 2b',2''', 2c. A radial spring 14 in the embodiment of FIG. 8 comprises four, symmetrically-arranged resilient tongues 15. A plate spring 16 in the embodiment of FIG. 9 generally corresponds in plan to spring 14, but has a thickening, peripheral 7' like that in FIG. 3 but of spring wire. A leaf spring 17 in the embodiment of FIG. 10 is an arched, rectangular, sheet metal spring strip.

FIG. 11 shows three individual disk springs 21, 22 and 23 joined together like a bellows and guided on a reduced-diameter, projecting section 6d of the end face 1d of the displacer 2d. The detrimental dead space will be smallest when the outer diameter of these disk springs is approximately equal to that of the displacer 2d.

FIGS. 12 and 13 show three of four, symmetrically-arranged disk springs 24, 25, 26 on reduced-diameter, projecting sections 6e of the end face 1e of displacer 2e.

FIG. 14 shows a displacer 2f in operative, reciprocable association with the hollow space 43 in a cylinder 31 of a refrigerating machine as shown by arrow 44. The hollow space has a substantially-closed end 45 which is penetrated by a connection (not shown) for a working gas so that the portion of the hollow space between its substantially-closed end 45 and the end face 1f of the displacer 2f forms a variable-volume working space 46 for refrigerating operation when reciprocation of the displacer varies its volume in a thermodynamic cycle.

The displacer 2f is a cylindrical sleeve 32 having a structural member 33 across the end closest to the substantially-closed end 45 of the hollow space 43 for forming the end face 1f of the displacer. The end face has a reduced-diameter, indented portion 47 extending into the space 34 within the sleeve 32 for defining the dead space of the refrigerating machine when the displacer reciprocates to the substantially-closed end 45. The space 34 within the sleeve 32 may be filled with refrigeration material in a known manner.

The periphery of the structural member 33 on the side opposite the sleeve 32 has a radial indentation at 35 extending to the end face 1f. The resulting, axial, projecting surface 38 of the structural member forms a radial guide for a corrugated-ring spring 3' and a ring-shaped adaptor 36 thereabout. The resulting, radial, peripheral surface of the structural member forms an axial support surface for one side of the corrugated-ring spring.

The other side of the corrugated-ring spring 3' engages one side of the ring-shaped adaptor 36 to urge the adaptor toward the substantially-closed end 45 of the hollow space. The adaptor has a radially-inwardly open channel 39 thereabout, giving the adaptor an inwardly-open, U-shaped cross section. Pins 41 (only one shown) project from the structural member 33 into the channel 39 to delimit the spring-urged position of the adaptor toward the substantially-closed end of the hollow space by engaging the opposite side of the spring-engaged side of the adaptor. In this position the adaptor 36 projects farther toward the substantially-closed end 45 of the hollow space than the end face 1f of the structural member of the displacer by an amount equal to the axial width of the channel 39 in the adaptor so that, when spring 3' is compressed, the adaptor 36 can be flush with the end face 1f of the damper. The adaptor also has a diameter substantially equal to the displacer 2f. By these measures, the adaptor minimizes the effective dead space in the working space 46 to the volume determined by the indented portion 47 of the displacer.

For this and the vibration and noise damping function of the spring, in operation, when the displacer 2f reciprocates toward the substantially-closed end 45 far enough, the adaptor, and not the displacer, contacts the substantially-closed end. This, however, produces little vibration or noise because the adaptor yields toward the displacer by compressing spring 3' to damp both. Further, by having the adaptor the same diameter as the displacer and movable flush therewith, the working gas in the working space 46 does not circulate in or around the adaptor as it yields with the spring upon further reciprocation of the displacer to the substantially-closed end where it is flush with the end face 1f of the displacer, leaving only the dead space of the indentation 47.

Those in the art will under the embodiments of FIGS. 1 to 13 operate similarly with the spring alone, the embodiments having projecting displacer portions like 6a in FIG. 2, however, determining the dead space with the space thereabout and the embodiments having flat displacer end faces like 1 in FIG. 1 determining the dead space with the spring.

Those in the a art will further understand how adaptors like 36 in FIG. 14 could be arranged for the embodiments of FIGS. 1 to 13 or others.

Those in the art will still further understand that springs like those in FIGS. 1 to 14 or others could be arranged also on the other ends (not shown) of the displacers. This is especially useful when the displacers are pneumatically reciprocated.

Those in the art will still further appreciate that the instant specification and claims are set forth by way of illustration and not of limitation, and that various other changes and modifications may be made without departing from the spirit and scope of the present invention.

What is claimed is:

1. In a refrigerating machine having a hollow space with at least one substantially-closed end and a displacer across the hollow space and reciprocable toward and away from the substantially-closed end of the hollow space, the improvement comprising:

a corrugated spring in the hollow space between the substantially-closed end of the hollow space and the displacer, the spring having spring action in the direction of displacer reciprocation and a maximum dimension which is less than the maximum distance from the substantially-closed end of the hollow space to which the displacer reciprocates and greater than the minimum distance from the substantially-closed end of the hollow space to which the displacer reciprocates, whereby to damp noise and vibration which would occur if the displacer contacted the substantially-closed end of the hollow space undamped as the spring is compressed while therebefore avoiding interference with the thermodynamic cycle produced by the displacer for the refrigerating operation of the machine.

2. The refrigerating machine according to claim 1, and further comprising an adaptor between the spring and the substantially-closed end of the hollow space and cooperative with the displacer for being able to be substantially flush with an end face thereof when the spring is compressed.

3. The refrigerating machine according to claim 2, wherein the displacer further comprises means for axially guiding the adaptor.

4. The refrigerating machine according to claim 3 wherein the adaptor is a ring and the displacer is cylindrical having the same diameter as the adaptor.

5. The refrigerating machine according to claim 4, wherein the spring and adaptor are connected to the displacer.

6. The refrigerating machine according to claim 2 wherein the adaptor is a ring and the displacer is cylindrical having the same diameter as the adaptor.

7. The refrigerating machine according to claim 6, wherein the spring and adaptor are connected to the displacer.

* * * * *

UNITED STATES PATENT AND TRADEMARK OFFICE
CERTIFICATE OF CORRECTION

PATENT NO. : 4,642,995

DATED : February 17, 1987

INVENTOR(S) : Bächler et al

It is certified that error appears in the above-identified patent and that said Letters Patent is hereby corrected as shown below:

Column 5, line 3 after "the" delete "a".

Signed and Sealed this

Twenty-seventh Day of October, 1987

Attest:

DONALD J. QUIGG

Attesting Officer

Commissioner of Patents and Trademarks